Patented Mar. 4, 1924.

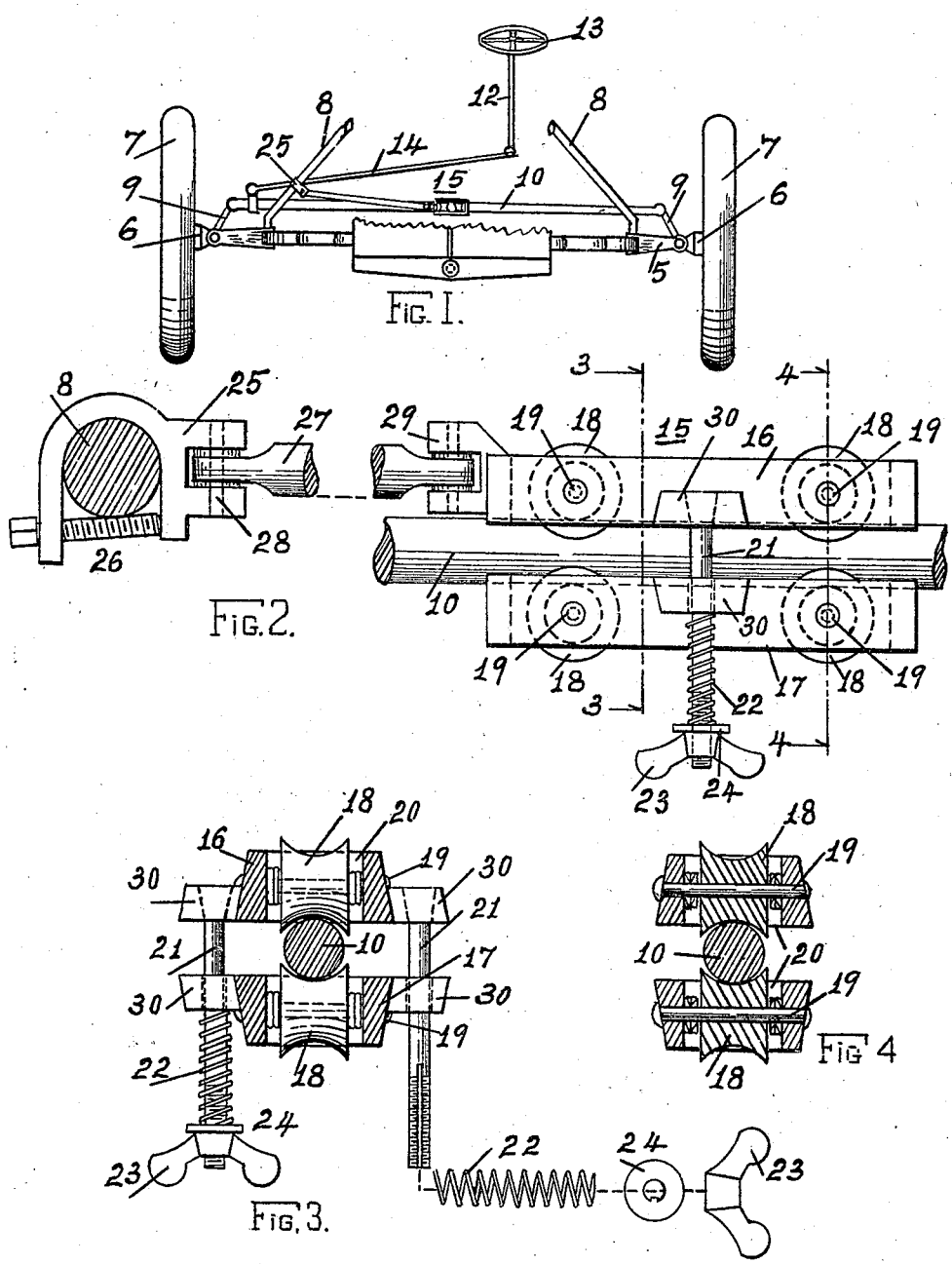

1,485,529

UNITED STATES PATENT OFFICE.

JACOB E. REMPE, OF SPRINGFIELD, ILLINOIS.

TENSION DEVICE FOR THE STEERING GEAR OF AUTOMOBILES.

Application filed November 25, 1922. Serial No. 603,371.

*To all whom it may concern:*

Be it known that I, JACOB E. REMPE, a citizen of the United States, residing at Springfield, in the county of Sangamon and State of Illinois, have invented a new and useful Tension Device for the Steering Gear of Automobiles, of which the following is a specification.

The invention is illustrated in the accompanying drawing in which Figure 1 is a top plan of the steering gear of an automobile showing the improved tension device connected with the steering rod and one radius rod of an automobile. Fig. 2 is an enlarged side elevation of the tension device in place on the steering rod and connected with one radius rod of the automobile. Fig. 3 is a vertical transverse section on the line 3—3 of Fig. 2 and Fig. 4 is a vertical section on the line 4—4 of Fig. 2. The same reference numerals designate the same parts in all the views. The purpose of the invention is; to provide a tension device which will prevent plunging action of the steering rod, resulting from wabbling of the front wheels of the vehicle, due to wear and loosening of the connections between the steering shaft and the steering rod thereby avoiding liability of accident which might result from turning either front wheel too suddenly inward.

Numeral 5 designates the front axle of an automobile.

Spindles 6, on which the front wheels 7 rotate are pivotally connected at the respective ends of the axle. Radius rods 8 of the usual well known construction are secured on the axle by any suitable means. Levers 9 attached to the respective spindles 6 are connected with the steering rod 10 at the respective ends of the rod. The steering shaft 12 is connected with and operated by the wheel 13. A connecting rod 14 connects the shaft 12 with the steering rod 10 in such manner that the steering wheel may be used to effect right hand and left hand oscillations of the rod, to control the direction of travel of the vehicle wheels.

The tension device, designated as a whole by the numeral 15, comprises a longitudinal top block 16; a complemental bottom block 17; grooved rollers 18 rotating freely on the pins 19 extending across suitable openings 20; bolts 21 extending through extensions 30 and connecting the blocks 16 and 17 to hold the rollers 18 on the shaft 10; springs 22 surrounding the bolts 21; nuts 23 screwing onto the bolts 21; lock-washers 24 preventing loosening of the nuts on the bolts; a block 25 hooking on one radius rod 8; a screw 26 securing the block 25 on the radius rod; and a connecting rod 27, connected with the block 25 by a pivot 28, and connected with the member 16 by a pivot 29.

In practical use the block 25 will be placed and secured on the radius rod 8; the block-members 16 and 17 will be placed on the rod 10; the bolts 21 will be placed in aligned holes in the extensions 30; the springs 22 and the washers 23 will be placed on the bolts; and the nuts 23 will be screwed on the bolts to stress the springs 22 to such extent that the grooved wheels in the block-members 16 and 17 will grasp the rod with such controlled pressure that the rod may slide between the grooved wheels upon operation of the connecting rod 10 by the hand wheel 13, through the instrumentality of the shaft 12 and the connecting rod 14; but will oppose sliding of the rod 10 which might result from wabbling of the wheels and looseness in the joints of the connections. It is obvious that the tension of the springs 22 may be varied by tightening or loosening the nuts 23 on the bolts 21 to accurately control the sliding of the rod 10, according to the circumstances in each particular case.

Having fully described my invention what I claim as new and desire to secure by Letters Patent is:

In a tension device for the steering rods of automobiles, the combination of a longitudinally movable steering rod; spindles operatively connected at the respective ends of the steering rods; vehicle wheels rotative on said spindles; block members extending lengthwise of the connecting rod; grooved wheels carried by said block members and contacting with the periphery of the steering rod; springs controlling the pressure of said grooved wheels on the steering rods; means for controlling the stress of said springs and a stationary block and a connecting device connecting said stationary block with one of said block members, to prevent longitudinal movement of the block members on the connecting rod.

In witness whereof I have hereunto signed my name at Springfield, Illinois, this 21st day of November, 1922.

JACOB E. REMPE.

Witnesses:
RAY H. NEISEWANDER,
HUBERT KAHN.